United States Patent [19]
Steffy et al.

[11] Patent Number: 5,806,801
[45] Date of Patent: Sep. 15, 1998

[54] METHOD AND SYSTEM FOR FORMATIONKEEPING BETWEEN ORBITING SPACECRAFT BY VARYING THEIR BALLISTIC COEFFICIENTS

[75] Inventors: David A. Steffy, Herndon; Gregg E. Burgess, Fairfax, both of Va.; Maria J. Evans, Boulder, Colo.

[73] Assignee: Orbital Sciences Corporation, Dulles, Va.

[21] Appl. No.: 692,401

[22] Filed: Aug. 5, 1996

Related U.S. Application Data

[63] Continuation of Ser. No. 275,210, Jul. 14, 1994, abandoned.
[51] Int. Cl.$^6$ ....................................................... B64G 1/10
[52] U.S. Cl. ..................... 244/158 R; 244/164; 244/168; 244/172
[58] Field of Search ............................... 244/158 R, 159, 244/160, 164, 168, 172, 173

[56] References Cited

U.S. PATENT DOCUMENTS

| | | | |
|---|---|---|---|
| 3,588,000 | 6/1971 | Buckingham et al. | 244/1 |
| 4,262,867 | 4/1981 | Piening | 244/168 |
| 4,759,517 | 7/1988 | Clark | 241/168 |
| 5,124,925 | 6/1992 | Gamble et al. | 364/459 |
| 5,267,167 | 11/1993 | Glickman | 364/459 |

FOREIGN PATENT DOCUMENTS

| | | | |
|---|---|---|---|
| 524888 | 1/1993 | European Pat. Off. | 244/160 |
| 4243395 | 6/1993 | Germany . | |
| 9108949 | 6/1991 | WIPO | 244/172 |
| WO 92/09479 | 6/1992 | WIPO . | |

OTHER PUBLICATIONS

C. L. Leonard, W. M. Hollister & E.V. Bergmann, "Orbital Formationkeeping with Differential Drag," *AIAA Journal of Guidance and Control*, vol. 12, Jan.–Feb. 1989.

Michael Matthews & Susan J. Leszkiewicz, "Efficient Spacecraft Formationkeeping With Consideration of Ballistic Coefficient Control," *AIAA 26th Aerospace Sciences Meeting*, AA–88–0375, Jan. 1988.

Carolina Lee Leonard, "Formationkeeping of Spacecraft Via Differential Drag," *M.S. Thesis*, Massachusetts Institute of Technology, Jul. 1986.

Gregg E. Burgess, "Orbit Formation Determination and Maintenance of A Space Station Communications Platform System," *M.S. Thesis*, Massachusetts Institute of Technology, May 1985.

Richard H. Vassar and Richard B. Sherwood, "Formationkeeping for a Pair of Satellites in a Circular Orbit," *AIAA Journal of Guidance and Control*, Mar.–Apr. 1985, pp. 235–242.

Cotter, "Solar Sailing" Sandia Corp SCR–78 Apr. 1959.

*Primary Examiner*—Galen L. Barefoot
*Attorney, Agent, or Firm*—Jenner & Block

[57] ABSTRACT

The present invention provides a method and system for formationkeeping between two or more orbiting spacecraft by controlling the surface area of the spacecraft facing the direction of perturbative forces acting on the spacecraft. The actual position of each spacecraft is sensed and the distance between the spacecraft is computed. If this separating distance exceeds acceptable tolerances, the affected spacecraft are commanded to change their orientation so that the total surface area facing the direction of motion is altered. Alternatively, the total surface area of the spacecraft facing the direction of solar pressure can be altered. As a result, the forces acting on the spacecraft are altered which alters spacecraft position and velocity. In accordance with another aspect of the invention, surface area variations of individual spacecraft are used to maintain the planar separation between adjacent constellations of orbiting spacecraft at desired distances.

31 Claims, 5 Drawing Sheets

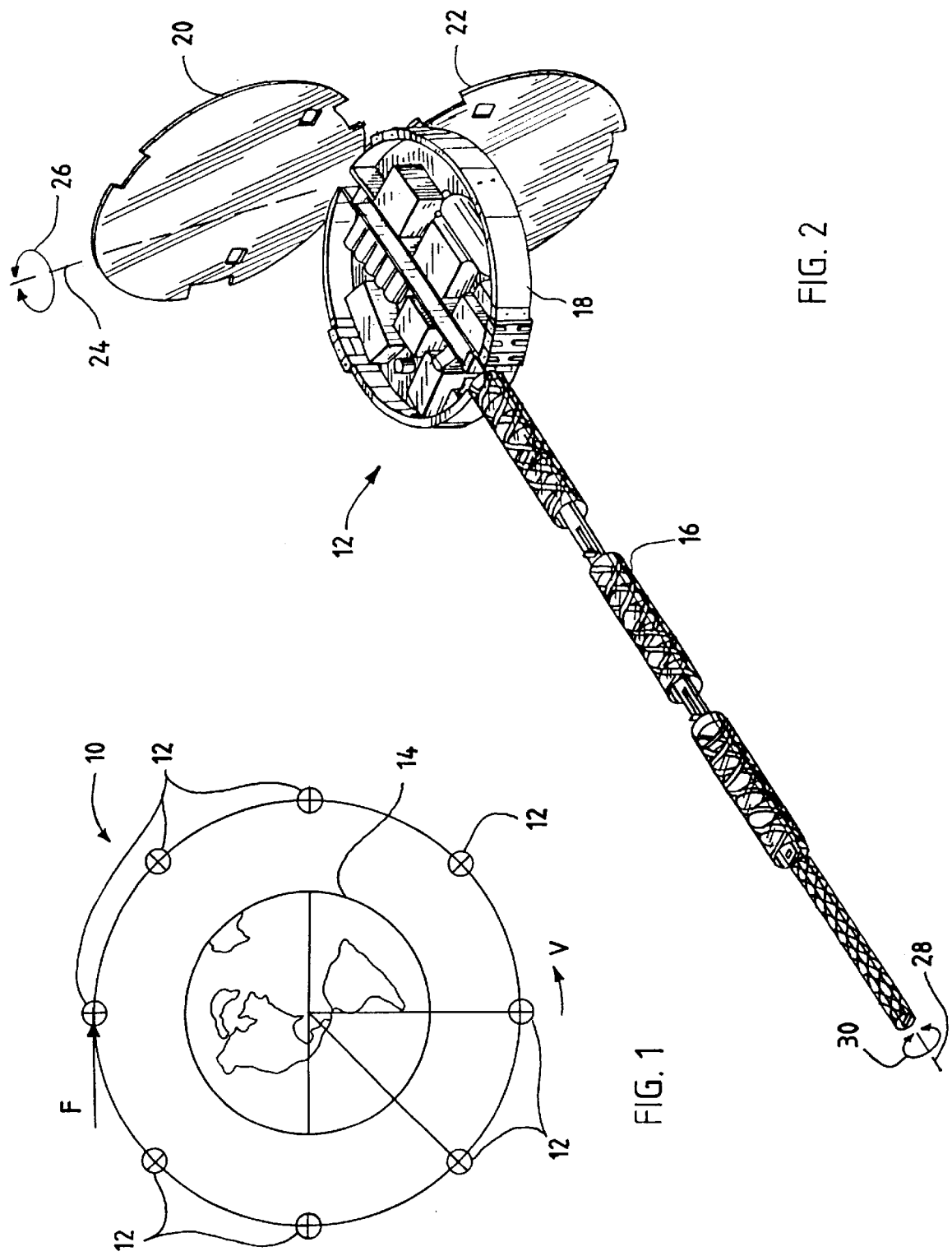

METHOD AND SYSTEM FOR FORMATIONKEEPING BETWEEN ORBITING SPACECRAFT BY VARYING THEIR BALLISTIC COEFFICIENTS

This application is a continuation of application Ser. No. 08/275,210 filed Jul. 14, 1994, now abandoned.

FIELD OF THE INVENTION

This invention relates to orbiting spacecraft and more particularly to a system and method for formationkeeping between two or more orbiting spacecraft by modulating their respective ballistic coefficients during at least a portion of their respective orbits while they are at sufficiently low altitude to experience atmospheric drag.

BACKGROUND OF THE INVENTION

Satellites in low altitude orbits are useful for a variety of applications. Many such applications require the use of a network, or constellation, of two or more cooperating satellites in a co-planar orbit. For example, "geobeacon", a network of sixteen or more satellites in low Earth orbit, has been deployed for use as an ultra-precise radio location system for determining the distance between two locations separated by large distances on the surface of the Earth to an accuracy of a few centimeters. In addition, constellations of satellites in low Earth orbits can be used to implement systems for communication between two points on the surface of the Earth.

The use of satellites for such applications often requires that the distance between each satellite in the constellation be maintained within a fairly tight tolerance.

Unfortunately, orbiting satellites are subject to "perturbative" forces such as those caused by the non-uniform gravity of the Earth, gravitational effects of other bodies, solar pressure and atmospheric drag. For satellites in low altitude orbits, or orbits having a low altitude perigee about the Earth (low Earth orbit) or any other body having a surrounding atmosphere, atmospheric drag is usually the predominant perturbative force. The perturbative forces on an orbiting spacecraft vary due to a number of factors, including the oblateness of the Earth (which results in gravitational forces not being uniform throughout the orbit), variations in atmospheric density and temperature (which affect drag) and the magnitude of solar activity (which results in fluxuations in solar pressure). Because the forces due to these factors are not uniform over an entire orbit and because the mass and profile of each satellite can vary over time and from one satellite to another, atmospheric drag and the other perturbations affect the inter-satellite spacing of orbiting constellations over time. Fortunately, techniques known in the art can be used to predict the magnitude and variation of these perturbative forces so that orbital maintenance can be performed.

In order to maintain proper inter-satellite spacing, each satellite in the constellation must compensate for the perturbative forces it experiences. The compensating maneuvers performed by the satellites in the formation are known in the art as "formationkeeping" or "formationflying." When only a single satellite is involved, compensating maneuvers to maintain constant satellite-to-station distances are called "stationkeeping."

In prior orbital maintenance systems, propulsive corrections have been used to compensate for these orbital perturbative forces. Such techniques have also been used to maintain in-track spacing in formationkeeping or stationkeeping applications. For example, U.S. Pat. No. 5,267,167 discloses a method and system that uses propellant fueled thrusters for keeping a constellation of satellites within a predetermined set of time and location goals. Using propulsion to counter perturbative forces, however, has a number of significant drawbacks. First, propulsion requires the expenditure of propellants, which limits the life of the spacecraft and requires additional launch mass. Second, for relatively small spacecraft, the action of even the smallest available propulsion system produces forces that are quite large relative to most perturbative forces, particularly atmospheric drag. This introduces secondary errors for which further corrective action must be taken.

Some studies have proposed that variations in the atmospheric drag force itself be used to perform formationkeeping or stationkeeping of orbiting spacecraft. These studies have examined the effect of controlling the ballistic coefficient of the spacecraft on spacecraft position and velocity. For example, Matthews and Leszkiewicz derived a series of control equations for maintaining the position of a generalized spacecraft with respect to a reference satellite, such as the Space Station, using the ballistic coefficient of the satellite as the manipulated variable. See Michael Matthews & Susan J. Leszkiewicz, "Efficient Spacecraft Formationkeeping With Consideration of Ballistic Coefficient Control," *AIAA 26th Aerospace Sciences Meeting*, AA-88-0375, January 1988. In addition, a study by Leonard examines the use of differential drag as an actuator for formationkeeping between two satellites to maintain the position of the "slave" satellite relative to the "master" satellite. See Carolina Lee Leonard, "Formationkeeping of Spacecraft via Differential Drag," M. S. Thesis, Massachusetts Institute of Technology, July 1986. In this study, differential drag between the master and slave satellites is created by varying the angle of attack of drag plates that are attached to each satellite.

Although these studies describe a useful technique, they fail to solve a number of important practical problems. First, the studies do not provide a fully generalized technique for maintaining a formation of two or more satellites orbiting as a constellation. For example, in the Leonard study, control of differential drag between two satellites was used to maintain a relative distance between a slave satellite and a master (i.e., a reference) satellite involving relatively short line-of-sight distances. Matthews and Leszkiewicz describe a technique for maintaining the distance between orbiting platforms and a reference satellite (i.e., the Space Station).

Second, the studies do not describe a convenient mechanism for modifying the satellite's ballistic coefficient. In Leonard, differential drag forces between the satellites were controlled by reorienting drag plates attached to the satellites. This solution adds launch mass to the satellite. Although Matthews and Leszkiewicz mention the possibility of varying the ballistic coefficients of spacecraft by adjustments in solar array orientation, they do not provide a method for continuously altering solar panel orientation to control spacecraft position while continuing to satisfying the power requirements of the spacecraft.

Therefore, there is a need for a method and system for maintaining the desired in-track spacing of two or more independent orbiting satellites by actively controlling the ballistic coefficient of each satellite in the constellation. In addition, there is a need for a method of formationkeeping by adjustment of satellite ballistic coefficient whereby the surface area of each satellite is modified by reorientation of the satellite itself or by reorientation of equipment normally deployed on such satellites.

SUMMARY OF THE INVENTION

The principal object of this invention is to provide an improved system and method for formationkeeping in a constellation of orbiting satellites. More specifically, it is an object of this invention to provide a system and method for maintaining the desired spacing (whether fixed or periodic) of a constellation of two or more satellites by using satellite orientation or the orientation of a portion thereof as a means for altering the surface area of the satellite and thereby altering the atmospheric drag force and/or the solar radiation pressure exerted on that satellite.

In accordance with the present invention, the formationkeeping system and method includes one or more networks of co-planar constellations of spaced orbiting satellites, wherein each satellite in the network can alter its surface area facing the direction of perturbative forces acting on the satellite. A control system (which may be ground based or located on-board the satellite) is provided which measures the position and velocity of each satellite, computes the position and velocity differences between the satellites and compares these differences to a position and velocity threshold level. If the actual position and velocity differences exceed acceptable tolerances, the control system corrects for the positional error by altering the windward surface area of the satellite and hence its ballistic coefficient. As a result, relative satellite position and velocity are controlled by the change in magnitude of the atmospheric drag forces exerted on the satellite. Alternatively, the control system can alter the surface area in the direction of solar radiation pressure to control the position and velocity of the satellites by the change in magnitude of the solar forces exerted on the satellite. In addition, a combination of control by variation of drag force and solar radiation pressure could be used.

In accordance with the invention, the atmospheric drag or solar radiation surface area of each satellite in the constellation can be modified by altering either the solar panel position or the yaw axis of the satellite or both. First, the solar panel on each satellite can be rotated about an axis perpendicular to the direction of satellite motion thereby varying the windward surface area of the satellite. Significantly, solar panel adjustments can be made while the satellite is in the eclipse portion of its orbit without adverse effects on the satellite's power supply. Second, the yaw angle (as well as the pitch or roll, depending upon the application) of each satellite can be varied, which also has the effect of changing the surface area of the satellite in the direction of motion.

The methods of the present invention can be used for any constellation of satellites, preferably in co-planar orbit, at any inclination or altitude where atmospheric drag and/or solar radiation pressure is a significant cause of relative motion between the satellites. In addition, the method of the present invention can be used in conjunction with either a ground-based or an autonomous formationkeeping system. These methods can also be used for stationkeeping a single satellite in a desired position relative to an orbiting space station.

The method and system of the present invention has a number of advantages over prior systems. First, the system does not require the use of propellants or propulsive thrusters, thus saving on space and mass. Second, the method of controlling satellite motion by modulating atmospheric drag or solar radiation forces exerted on the individual satellites produces relatively small corrective forces, thus preventing the creation of secondary errors which were common in the propulsive formationkeeping techniques used in prior systems. Third, the methods described herein control satellite motion without adding launch mass to the satellite and without affecting the solar energy available to the satellite.

In accordance with another aspect of the invention, a method and system is provided for achieving an initial orbit of one or more satellites or for establishing the initial formation of a network of deployed satellites. In this mode, the system alters satellite surface area in the direction of motion (i.e., the ballistic coefficient) to increase or decrease drag forces exerted on the satellite in order to achieve the precise velocity profiles required by initial orbit maneuvers. Alternatively, the control system alters the spacecraft surface area in the direction of the solar radiation pressure to increase or decrease solar forces exerted on the satellite in order to control the velocity profile of the satellite. In yet another alternative embodiment, both drag and solar pressure are varied by modulating the respective surface areas of the satellite to control the velocity profile of the spacecraft. The foregoing method allows for more precise control of satellite kinetic energy than was possible in prior propulsive formationkeeping or stationkeeping systems.

In yet another aspect of the invention, the planar separation between many coplanar constellations of satellites can be maintained by using ballistic coefficient control. In accordance with the invention, the ballistic coefficients of all the satellites in a constellation orbiting in the same plane are adjusted relative to those orbiting in an adjacent plane. As a result, the rate of precession of one orbit is altered relative to the adjacent orbit so that the angular spacing between the orbits can be controlled.

Other objects and features of the invention will be apparent from the following description and from the drawings.

BRIEF DESCRIPTION OF THE DRAWINGS

FIG. 1 is a schematic representation of a constellation of orbiting satellites in conjunction with the present invention;

FIG. 2 is a detailed perspective view of a satellite according to the invention;

DETAILED DESCRIPTION OF THE INVENTION

Figure 3B:
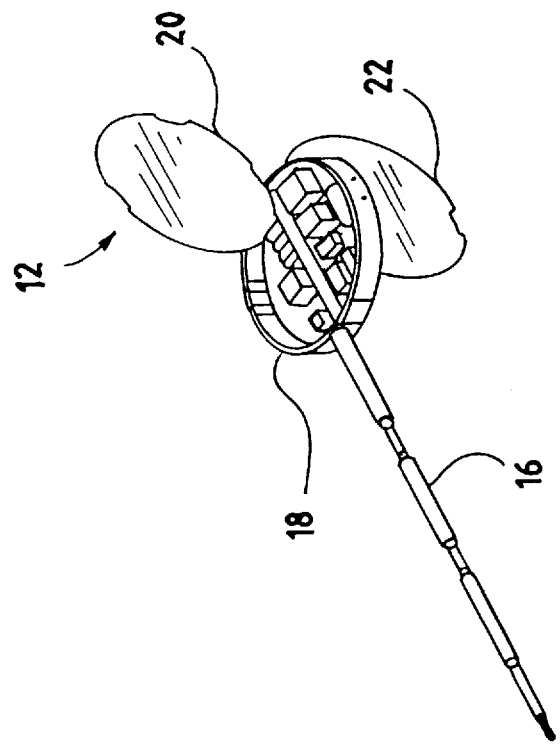
FIG. 3b is a perspective view of a deployed satellite showing its solar panels show in their high drag, or flared, position.

FIG. 1 shows a co-planar and co-orbital network or constellation 10 of satellites 12 in low altitude orbit around the Earth 14. Each satellite 12 or a portion thereof is capable of independent changes in orientation with respect to orbital motion. As noted above, accurate spacing between satellites in low Earth orbit is critical for many applications. Accordingly, the present invention includes a control means for monitoring the spacing between satellites 12 and maintaining the inter-satellite distances within a desired tolerance. To correct for any positional errors found, the control system signals the affected satellites to change their orientation by altering the amount of surface area facing the direction of satellite motion or the direction of solar pressure as described more fully below. As a result, the system of this invention modulates the drag and solar forces F exerted on satellites 12 in response to the inter-satellite positional error and thereby controls the inter-satellite spacing. The surface area adjustments are made by changing the orientation of the solar panels 20 of the satellite or by changing the orientation of the satellite itself or both. Advantageously, the orientation of solar panels 20 on the satellite to affect its ballistic coefficient can be carried out during the portion of the orbit where the sun is in eclipse so as to not affect the solar energy available to the satellite.

Although the invention is illustrated for use with satellite constellations in low Earth orbit, the invention is also suitable for use with constellations in any orbit where perturbations due to atmospheric drag and/or solar radiation pressure are significant. In addition, the methods of the present invention can be used to maintain constant satellite-to-station distances, where the station is in orbit along with the satellite, as well as inter-satellite distances as shown in the illustrated embodiment.

Orbiting satellites can be subjected to significant perturbative forces F due to atmospheric drag or solar radiation pressure. As shown in FIG. 1, drag force F is tangential to the satellite orbit and opposite in direction to constellation motion V. The acceleration (a) of satellite 12 due to drag force F is approximated by the following equation:

$$a = -(\tfrac{1}{2}) \rho \, (C_D A/M) V^2 \quad (1)$$

Where $\rho$ is the atmospheric density; A is the surface area of satellite 12 in the direction of satellite motion; V is the velocity of satellite 12; $C_D$ is the drag coefficient of the satellite; and M is the satellite mass. The ratio of the satellite mass to the product of its surface area and drag coefficient is known as the ballistic coefficient (B), i.e., $$B = M/(C_D A) \quad (2)$$

Substituting this expression into the above expression for acceleration (a) due to drag force F yields:

$$a = -(1/2) \frac{\rho V^2}{B} \quad (3)$$

Similarly, the acceleration of satellite 12 due to forces exerted by solar radiation pressure is given by the following expression:

$$a = -\frac{F_s}{C} (A_s/M)(1 + q)\cos(i) \quad (4)$$

Where $F_s$ is the solar constant (1358 W/M$^2$); C is the speed of light (3×10$^8$ M/S) ; $A_s$ is the surface area of the satellite 12 facing in the direction of the solar force; q is the reflectance factor; i is the angle of incidence to the sun; and M is the satellite mass.

In accordance with the present invention changes in the ballistic coefficient of each satellite 12 in constellation 10 are produced by varying the surface area A of each satellite that faces the direction of motion. According to equations (1) through (3), by changing the orientation of satellite 12 (or a portion thereof) such that its area A is increased, the satellite's ballistic coefficient B is decreased, thus increasing the drag force on the satellite. Conversely, if the drag surface area A is decreased, the ballistic coefficient of the satellite is increased and hence the atmospheric drag force F decreases. Similarly, according to equation (4), by varying the amount of surface area $A_s$ facing the direction of force due to solar pressure, the acceleration of the satellite due to these forces can be increased or decreased. In effect, the satellite surface area adjustments produce corrective forces that modify the in-track spacing of the satellites. Unlike prior propellant-based systems, these corrective forces are, on average, comparable in size to perturbative forces and, therefore, are less likely to cause undesirable secondary effects.

FIG. 2 illustrates the methods by which the cross-sectional area of satellite 12 is manipulated in conformance with the present invention. Satellite 12 includes a body or disk 18, a nadir-pointing antenna system 16 and a pair of solar panels 20 and 22 extending perpendicularly from the disk 18 for providing power to the satellite. Solar panels 20 and 22 are mounted on hinges (not shown) so that the panels can be folded for convenient stowage. In addition, solar panels 20 and 22 are mounted for rotation about an axis 24 in the direction shown in FIG. 2 by arrow 26. The rotation of solar panels 20 and 22 about axis 24 can be used, for example, to vary the surface area of satellite 12 in the plane perpendicular to the direction of motion and for maximizing the amount of solar radiation absorbed by panels 20 and 22.

Satellite 12 is constructed for movement about a yaw axis 28 in the direction of motion shown by arrow 30 in FIG. 2. The yaw movement of satellite 12 about axis 28 is substantially perpendicular to the rotational movement of solar panels 20 and 22 about axis 24, thereby providing a second axis of movement. Additionally, this second axis of movement provides a second means for increasing or decreasing the surface area of satellite 12 in the direction of motion or in the direction of solar pressure. The yaw movement of satellite 12 is achieved by a conventional attitude control system. The details of the general construction of satellite 12 is disclosed in a copending application, assigned to the assignee of the present invention, for a "Satellite Having a Stackable Configuration", Ser. No. 08/191,831 filed on Feb. 4, 1994, the disclosure of which is hereby incorporated by reference into the present application.

Figure 3A:
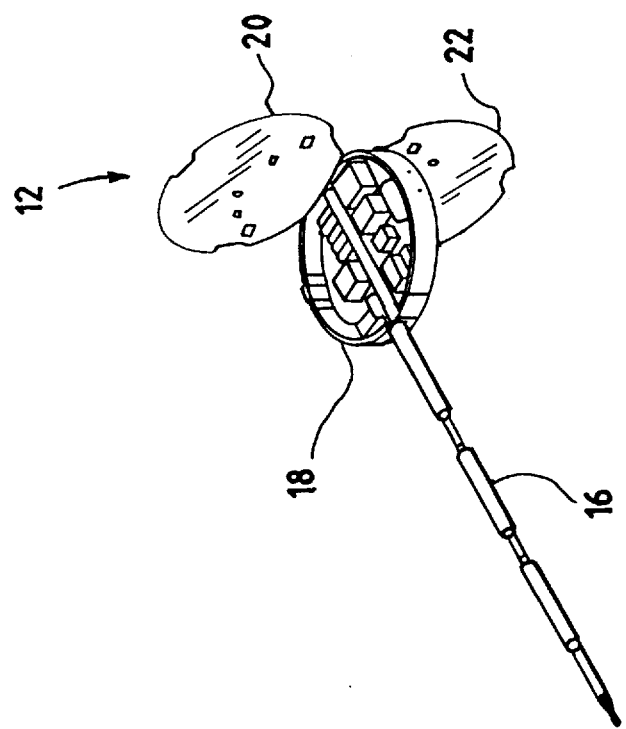
FIG. 3a is a perspective view of a deployed satellite showing its solar panels in their low drag, or feathered, position.

As noted above, the surface area of satellite 12 can be varied by rotating solar panels 20 and 22 about axis 24. Where disk 18 of satellite 12 lies in the plane of the orbit of constellation 10 (i.e., at a yaw angle of 0°), rotating solar panels 20 and 22 toward 90° about axis 24 (called the flared position) increases the satellite surface area thereby increasing the atmospheric drag forces F. An illustration of satellite 12 with its solar panels 20 and 22 in the flared position is shown in FIG. 3b. Alternatively, satellite surface area, and hence atmospheric drag F, can be minimized by "feathering" solar panels 20 and 22 substantially as shown in FIG. 3a. By flaring and feathering solar panels 20 and 22, the formationkeeping system can effectively alter the ballistic coefficient of satellite 12 as described more fully below.

The surface area of satellite 12 can also be varied by rotation about yaw axis 28. As best illustrated in FIG. 2, when satellite 12 rotates about axis 28, the surface area A due to the profile of satellite disk 18 gradually increases, reaching a maximum when the yaw angle is 90°. It should be noted that in the preferred embodiment, radiation patterns emitted by antenna system 16 are substantially symmetrical about axis 28 so that yaw rotation to alter the satellite cross-sectional surface area does not affect radio transmissions. It should also be observed that the influence of solar panels 20 and 22 on drag force F diminishes as the yaw angle of satellite 12 increases. When the satellite 12 reaches a yaw angle of 90°, solar panels 20 and 22 present roughly the same surface area in the direction of motion regardless of the angle of rotation about axis 24. At yaw angles between 0° and 90°, both solar panel rotation about axis 24 and satellite rotation about yaw axis 28 influence atmospheric drag force F.

The use of solar panels 20 and 22 as a means of controlling drag and solar pressure forces is somewhat constrained by the power requirements of satellite 12. While satellite 12 is exposed to the sun, it is desirable that the orientation of the satellite and the solar panels 20 and 22 be maintained to maximize the amount of solar radiation incident to the solar panels. However, the orientation of satellite 12 and solar panels 20 and 22 is virtually unconstrained for most of the period that the satellite is not exposed to the sun (i.e., when the satellite 12 is in the eclipse portion of its orbit). During this time, modulation of atmospheric drag forces can be accomplished at least partially through variation of the position of solar panels 20 and 22, the orientation of disk 18, or a combination of these.

Moreover, effective formationkeeping can be performed for some orbits that do not have a significant eclipse period. Because a relatively small period of time is needed to perform formationkeeping maneuvers, and because the spacecraft may have excess power capacity while orbiting in full daylight, in some instances the solar panel can be used to alter satellite surface area even when the satellite spends a substantial amount of time in full daylight orbits. Analysis has shown that for such orbits, the power demands of the satellite 12 can be satisfied even where the solar panels are used for atmospheric drag surface area variation for up to 30% of the daylight orbit period. This is sufficient to maintain in-track spacing for formationkeeping purposes for many orbit configurations.

Figure 5:
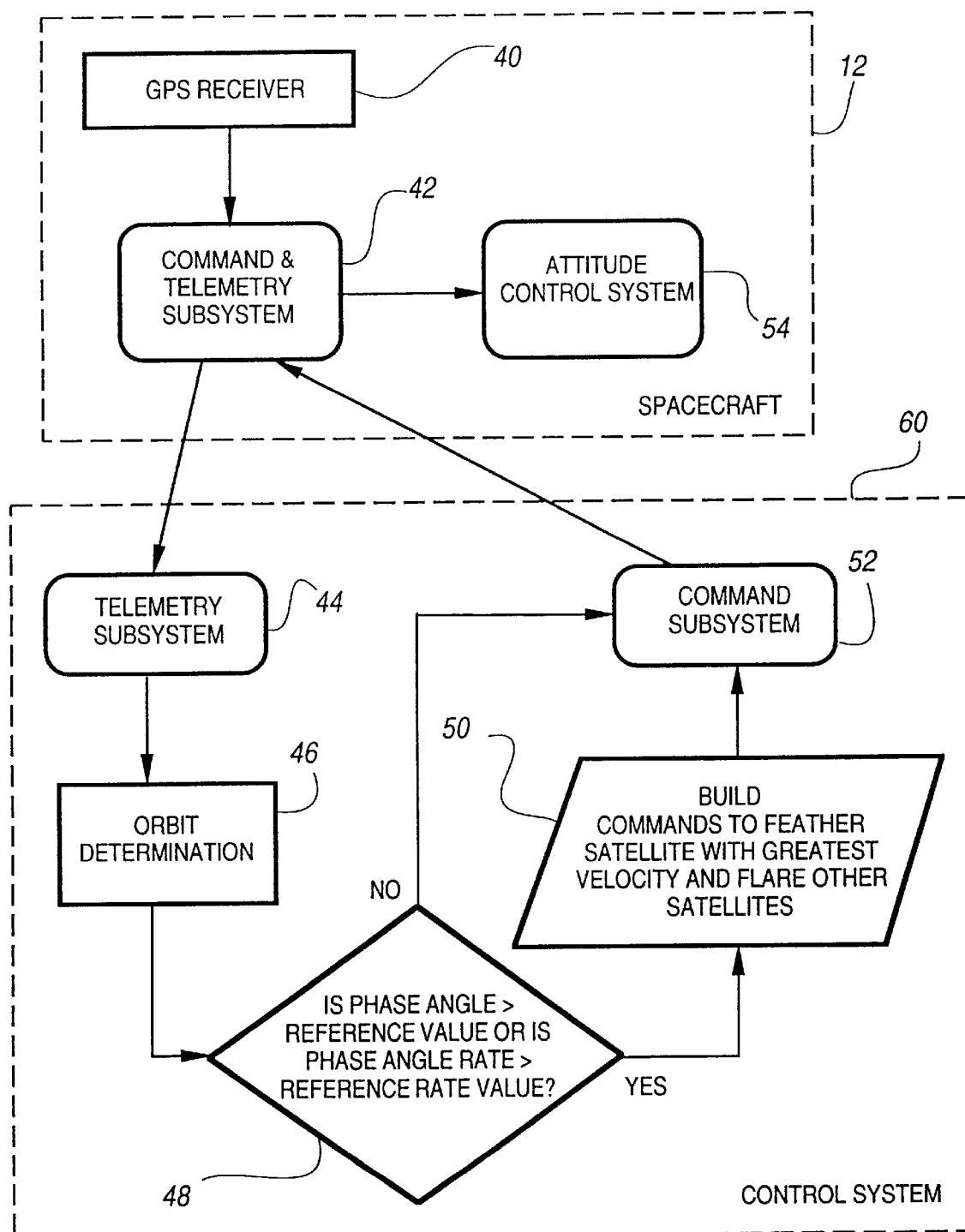
FIG. 5 is a schematic block diagram of the formationkeeping ballistic coefficient control system.

FIG. 5 is a schematic block diagram of the formationkeeping control system of the present invention. It is to be noted that although the control system will be described as using variations in atmospheric drag surface area (and hence in the ballistic coefficient of the satellite) to change satellite position and velocity, the control system can also use variations in surface area in the direction of solar radiation pressure to alter satellite motion where the magnitude of the solar pressure is significant.

At block 40, the control system receives the actual position of each satellite 12 in constellation 10. In the preferred embodiment, each satellite 12 is equipped with a position and velocity measuring device. A NAVSTAR™ Global Positioning System (GPS) receiver can be used for this purpose. The GPS comprises a constellation of reference satellites that emit a reference signal. The GPS receivers 40 on board satellite 12 calculate accurate absolute position and velocity information from the reference signal. This information is then transmitted via telemetry subsystems 42 and 44 to the ground-based control system 60 on the Earth's surface. Although the operation of the control system 60 is described with reference to a ground-based system, the methods of the present invention could also be used with satellite-to-satellite crosslinks to allow for autonomous control.

At block 46, the control system 60 computes the differences in position and velocity of each satellite 12 in constellation 10. At decision block 48, the current position differences (i.e., phase angle as shown in block 48) and velocity (i.e., phase angle rate) are each compared to a reference value or setpoint. If the position difference between any two or more satellites is greater than the reference value (e.g., 45° plus or minus 5° for an eight-satellite constellation), the control system 60 initiates corrective action by computing new position commands at block 50 and transmitting the commands to the affected satellites through command subsystem 52 and the telemetry subsystem 42 of the spacecraft. These commands are passed to the spacecraft's attitude control system 54, which makes the required adjustments.

When the separation between any two satellites exceeds acceptable limits, at block 50 the control system generates commands so that the satellites with the greatest velocity will decrease their surface area by feathering their solar panels (hence, increasing their ballistic coefficient). The remaining (i.e., slower) satellites will increase their surface area by flaring their solar panels (hence, decreasing their ballistic coefficient). Consequently, energy is removed from the orbit of the slower satellites which causes the orbit to decay slightly. These satellites will then have a shorter orbit period and, therefore, the mean velocity of the satellites increases. Conversely, decreasing the surface area of the faster satellites decreases the rate of orbit decay and, therefore, the velocity of these satellites tends to remain constant. The process continues until all satellites attain the desired spacing and same mean velocity.

Control system 60 also employs a predictive algorithm to compensate for the large lag times inherent in the control of satellite motion through changes in its ballistic coefficient. The predictor uses a model of the space environment along with measurements of actual satellite motion to initiate control before the separation between the satellites reaches its critical threshold value. First, the velocity measurements of all the satellites in the constellation are used to compute the rates of separation between all the satellites and, based on these separation rates, to estimate when the respective satellites will reach the separation threshold. Next, the control system estimates the duration of the ballistic coefficient control process (i.e., "the control duration window") based on current orbit parameters and the expected magnitude of the perturbative forces. Finally, based on the control duration window, the control system initiates a change in the satellite surface area (if necessary) before the satellites reach the separation threshold.

In the preferred embodiment, the controlled satellites are commanded to change their position so as to maximize or minimize, their ballistic coefficients (and hence to minimize or maximize, respectively, the drag force F that each satellite experiences). Alternatively, the control system can employ other algorithms that vary the ballistic coefficient as a function of the positional error magnitude, e.g., proportional or integral control or a combination thereof. As described above, the ballistic coefficient can be increased or decreased by feathering or flaring solar panels 20 and 22, respectively, about axis 24 or by increasing or decreasing the yaw angle of satellite 12, respectively, about axis 28 or by a combination of both maneuvers.

Figure 4:
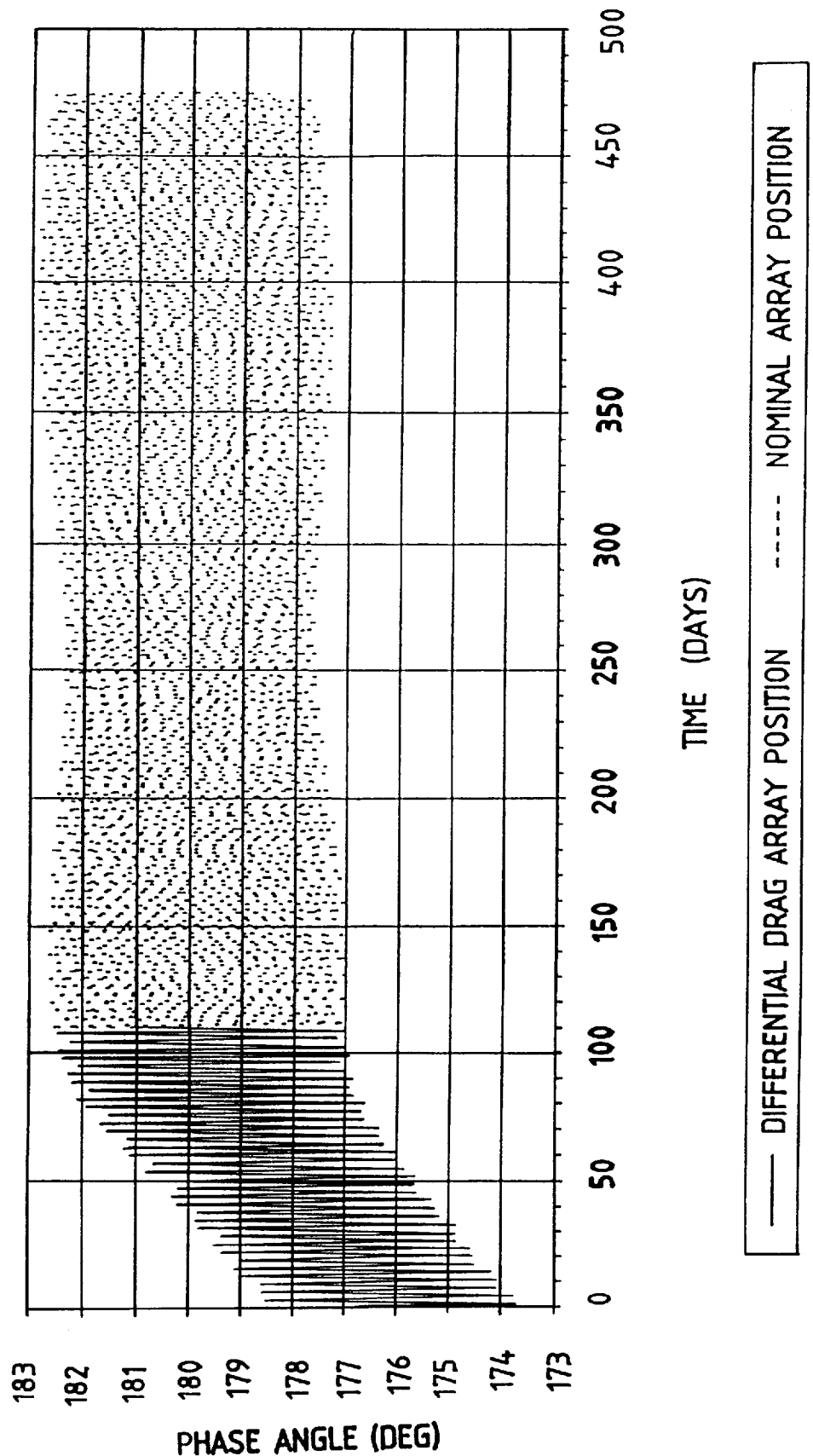
FIG. 4 is a graph showing the control response of a two-satellite constellation being controlled by the methods of the present invention.

FIG. 4 shows the control band of a two-satellite constellation using an on/off control method. As seen in the graph of FIG. 4, the satellite position oscillates about the optimum by a small amount due to periodic gravitational effects on the orbits of the two satellites. The control system is stable because the variation in atmospheric drag force produced by the control maneuvers is relatively small. Modulation of satellite ballistic coefficients in accordance with this invention produces a 15% variation in long-term average drag force F on each satellite. This is only several times larger than the perturbations which cause the satellite to drift apart. As a result, minimal secondary errors are introduced by the control system. Propulsive formationkeeping systems, on the other hand, produce forces on the order of hundreds of times these orbit perturbations, which can cause undesirable secondary effects.

The present invention also provides a method for "formationfinding," or final orbit trimming, to initiate the orbit of a deployed satellite. In targeting to achieve a particular orbit, the satellite 12 must undergo several precise maneuvers to eliminate the effect of the forces imposed on the satellite during separation from the launch vehicle. The satellites are detached from the launch vehicle so that their initial velocities cause the satellites to separate and move towards their final spacing. Next, initial orbit maneuvers are performed to synchronize the orbits. Where, as in prior systems, the maneuvers are performed by thrusters, orbit insertion can be incomplete because even the smallest available thrusters cannot provide energy in precise amounts. In addition, uncertainties regarding satellite position and velocity contribute to orbit insertion errors. As a result, after the insertion maneuvers are completed, the satellites may still drift apart at some small rate.

In conformance with the present invention, final orbit insertion is completed by removing precise amounts of energy, in conformance with the satellite's desired orbit trimming profile, by varying the ballistic coefficient of the satellites or by varying the effects of solar pressure on the satellite. In effect, control of drag forces and solar radiation pressure produces a tiny thruster that is capable of more exact corrections than typical propellant-fueled thrusters. FIG. 4 illustrates the initial separation profile of a two-satellite constellation. After separation from the launch vehicle, several thruster maneuvers are used to achieve an initial separation rate as represented by the initial slope in phase angle shown in FIG. 4. The separation rate is then reduced to achieve final orbit trimming by altering the satellite's atmospheric drag surface area or solar radiation surface area or both. In the example illustrated in FIG. 4, ballistic coefficient control was employed during eclipse periods for approximately 110 days after the last thruster maneuver.

In accordance with yet another aspect of the invention, control of atmospheric drag and solar radiation forces can be used to maintain planar separations between several adjacent constellations. In this mode of operation, after each satellite in a constellation has achieved proper in-track separation using the methods described above, the atmospheric drag or solar radiation pressure surface areas of each satellite in the constellation are varied through solar panel rotation or satellite yaw angle adjustments or both. As a result, the constellations can achieve proper right ascension separations between themselves. By varying the amount of energy removed from an orbit through control of drag or solar forces, the semi-major axes of two constellations can be controlled relative to each other. Because the rate of precession of an orbit depends in part upon its semi-major axis, surface area control of all of the satellites in one orbit plane can vary the angular spacing between that orbit and an adjacent orbit plane.

Figure 6:
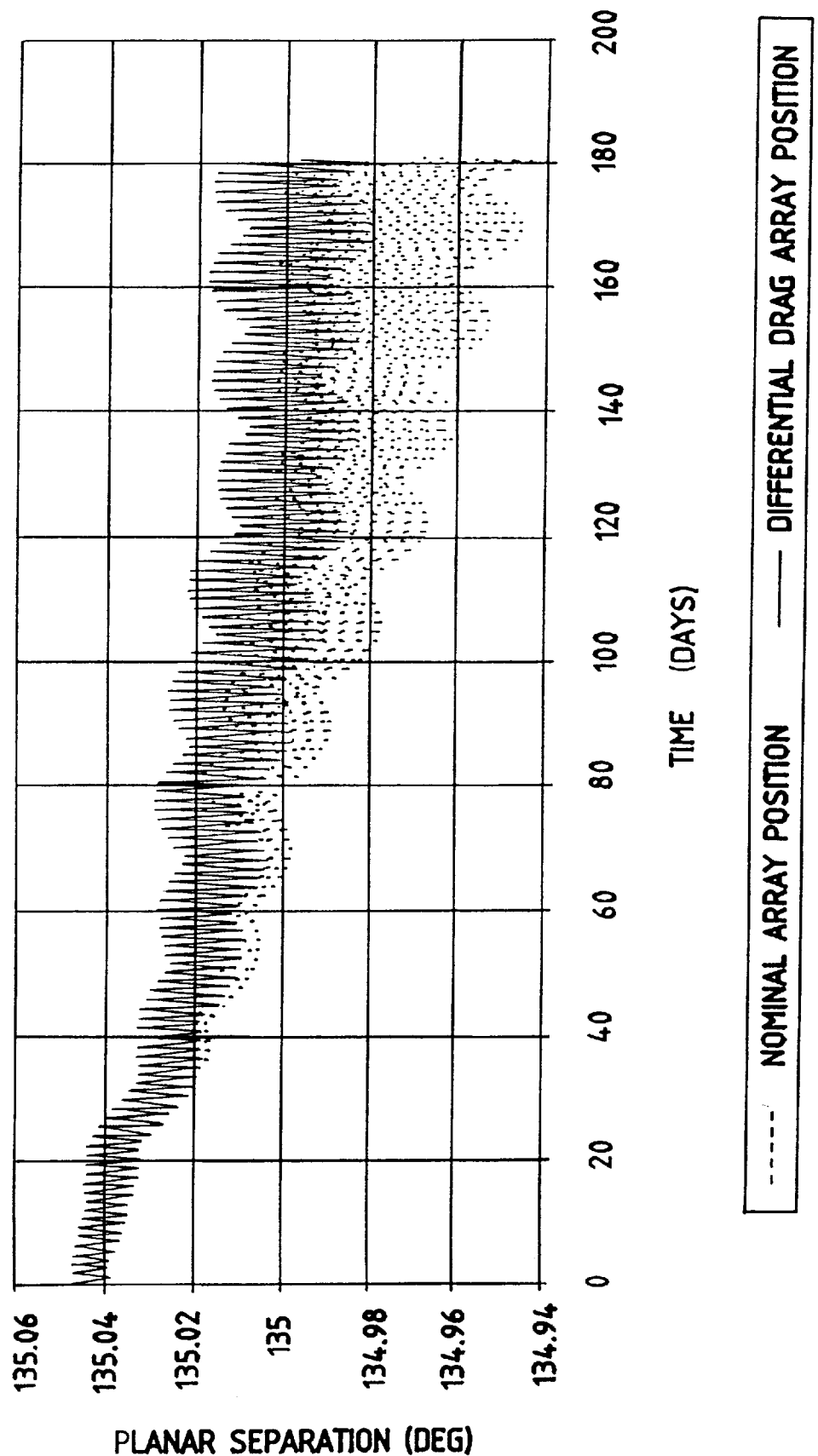
FIG. 6 is a graph showing the planar separation between two adjacent orbit planes being controlled by the methods of the present invention.

FIG. 6 is a graph which plots the planar separation between two adjacent orbits of satellites that are being controlled in conformance with the present invention. As shown in FIG. 6 through control of the atmospheric drag forces exerted on the individual satellites in adjacent orbits, planar separation drift (represented by the dashed line trace of FIG. 6) can be eliminated so that the adjacent orbits are maintained at a constant separation (represented by the solid line trace of FIG. 6).

While illustrative embodiments of the invention are shown in the drawings and are described in detail herein, the invention is susceptible of embodiment in many different forms. It should be understood that the present disclosures are to be considered as an exemplification of the principles of the invention and are not intended to limit the invention to the embodiment illustrated.

We claim:

1. A system for controlling the separation between at least two groups of orbiting spacecraft comprising:

means for providing an output signal corresponding to the planar separation of said groups;

adjustment means for varying the amount of surface area of each spacecraft within at least one of the groups facing the direction of a perturbative force acting on said spacecraft; and control means responsive to said output signal for causing said adjustment means to vary said surface area of said spacecraft within at least one of the groups where the planar separation between the groups exceeds a predetermined separation limit.

2. The system of claim 1 wherein said adjustment means further comprises means for varying the ballistic coefficient of each spacecraft by varying the surface area of said spacecraft facing the direction of motion of said spacecraft.

3. The system of claim 1 wherein said adjustment means further comprises means for varying the surface area of said spacecraft facing the direction of solar pressure.

4. The system of claim 1 further comprising means for providing a rate output signal corresponding to the rate at which the planar separation of said groups is changing, and wherein said control means is responsive both to said output signal and said rate output signal for causing said adjustment means to vary said surface area of said spacecraft within at least one of the groups where the planar separation between the groups exceeds a predetermined separation limit.

5. A method for maintaining the spacing between at least two spacecraft in orbit about a primary body within a predetermined range comprising the steps of:

determining the desired spacing between the spacecraft;

measuring the actual spacing between the spacecraft;

comparing said actual spacing to the desired spacing; and adjusting the surface area of the spacecraft facing the direction of a perturbative force acting on the spacecraft so as to cause the actual spacing between the spacecraft to change toward the desired spacing before the actual spacing is outside the predetermined range, wherein the chance toward the desired spacing is brought about without applying positive thrust to the spacecraft.

6. The method of claim 5 herein the step of adjusting the spacecraft surface area comprises the step of adjusting the ballistic coefficient of the spacecraft by altering the surface area of said spacecraft facing the direction of motion of said spacecraft.

7. The method of claim 6 wherein each said spacecraft further comprises an adjustable solar panel and wherein the step of adjusting the ballistic coefficient of each spacecraft further comprises adjusting the orientation of said solar panel, thereby altering the surface area of said spacecraft facing the direction of motion of said spacecraft, while said spacecraft is in the eclipse portion of its orbit.

8. The method of claim 5 wherein the step of adjusting the surface area of the spacecraft comprises the step of altering the surface area of said spacecraft facing the direction of solar pressure.

9. A method for controlling the planar separation between two groups of spacecraft orbiting the earth comprising the steps of:

determining the desired planar separation between said groups;

measuring the actual planar separation between said groups;

comparing said actual planar separation to said desired planar separation; and adjusting the surface area facing the direction of motion of said spacecraft within at least one of said groups to thereby cause the orbital trajectories of said spacecraft to change so as to diminish the difference between the actual planar separation and the desired planar separation, wherein the change in orbital trajectories of said spacecraft is brought about without applying positive thrust to the spacecraft.

10. The method of claim 9 wherein each said spacecraft further comprises an adjustable solar panel and wherein the step of adjusting the surface area facing the direction of motion of said spacecraft further comprises adjusting the orientation of said solar panel while said spacecraft is in the eclipse portion of its orbit, thereby altering the surface area of said spacecraft facing the direction of motion of said spacecraft.

11. A system for maintaining the desired spacing between at least two spacecraft in a constellation orbiting about a primary body comprising:

means for providing a position output signal corresponding to the position of each spacecraft;

means for providing a velocity output signal corresponding to the velocity of each spacecraft;

adjustment means for varying the ballistic coefficient of each spacecraft; and control means responsive to said position output signals and said velocity output signals for causing said adjustment means to vary the ballistic coefficient of at least one of said spacecraft so as to change the relative velocity of the spacecraft with respect to each other, wherein the relative velocity of said spacecraft with respect to each other is controlled so as to maintain the spacing between said spacecraft within a desired range.

12. The system of claim 11 wherein said control means causes said adjustment means to modify the surface area of said spacecraft such that the ballistic coefficient of the one of said spacecraft having the greatest velocity magnitude is increased and the ballistic coefficient of the one of said spacecraft having the lowest velocity magnitude is decreased.

13. A method for maintaining the spacing between at least two spacecraft in orbit about a primary body comprising the steps of:

determining the current position and velocity of each spacecraft;

determining from the velocity of each spacecraft the separation rate, which is the rate at which the spacing between the two spacecraft is changing;

from the separation rate and the current position of each spacecraft, determining when the spacing between the spacecraft will reach a separation limit with the existing ballistic coefficient of each respective spacecraft;

determining a control duration window, which is the length of time that the ballistic coefficient of at least one of the spacecraft must be varied to change the separation rate so as to avoid reaching the separation limit; and changing the ballistic coefficient of at least one of the spacecraft at a time at least partly determined by the control duration window such that the separation limit is not reached, wherein spacing between the spacecraft is maintained within the separation limit without applying positive thrust to the spacecraft.

14. The method of claim 13 wherein the step of changing the ballistic coefficient further comprises increasing the ballistic coefficient of the spacecraft with the highest velocity and decreasing the ballistic coefficient of the spacecraft with the lowest velocity.

15. The method of claim 13 wherein the step of changing the ballistic coefficient further comprises changing the ballistic coefficient of each spacecraft by an amount proportional to the separation rate of the spacecraft.

16. The method of claim 13 wherein the step of changing the ballistic coefficient further comprises changing the ballistic coefficient of each spacecraft by an amount proportional to the position and velocity of that spacecraft.

17. The method of claim 13 wherein the ballistic coefficient of each spacecraft is maintained substantially constant throughout the control duration window.

18. The method of claim 13 wherein the separation limit further comprises both a minimum spacing and a maximum spacing between the spacecraft.

19. A method of providing desired right ascension separation between a pair of planar groups of spacecraft in orbit about the earth comprising:

controlling the semi-major axis of each group of spacecraft by varying the ballistic coefficients of the spacecraft in at least one of the groups and without applying positive thrust to the spacecraft, thereby selectively removing energy from the spacecraft in at least one of the groups to vary the right ascension of said group.

20. A method of adjusting the final trajectory of a spacecraft during the deployment of the spacecraft into orbit about the earth after separation from a launch vehicle comprising the steps of:

separating the spacecraft from the launch vehicle with an initial velocity to cause it to move toward its desired trajectory; and removing energy from the spacecraft by varying the ballistic coefficient of the spacecraft, thereby causing the spacecraft to move still closer toward its desired trajectory.

21. The method of claim 20 further comprising the step of actuating a propellant-fueled thruster on the spacecraft to at least partially counter undesired forces exerted on the spacecraft during its separation from the launch vehicle and to cause the spacecraft to move closer toward its desired final trajectory before the step of removing energy by varying the ballistic coefficient.

22. The method of claim 20 wherein the step of removing energy further comprises removing energy from the spacecraft in conformance with an orbit trimming profile.

23. A system for controlling the separation between two groups of orbiting spacecraft comprising:

means for providing a first output signal corresponding to the rate at which the planar separation of said groups is changing;

adjustment means for varying the amount of surface area of each spacecraft within at least one of the groups facing the direction of a perturbative force acting on said spacecraft; and control means responsive to said first output signal for causing said adjustment means to vary said surface area of said spacecraft within at least one of the groups where the rate of change of the planar separation between the groups exceeds a predetermined separation rate limit.

24. The system of claim 23 further comprising means for providing a second output signal corresponding to the planar separation of said groups, and wherein said control means is responsive to both said first output signal and said second signal for causing said adjustment means to vary said surface area of said spacecraft within a least one of the groups where the rate of change of the planar separation between the groups exceeds a predetermined separation rate limit.

25. A method for maintaining the desired spacing between at least two spacecraft, each orbiting a planetary body in a trajectory having a portion in eclipse from the sun, comprising:

providing a position output signal corresponding to the position of each spacecraft;

providing a velocity output signal corresponding to the position of each spacecraft;

adjusting the ballistic coefficient of at least one of the spacecraft, substantially while the spacecraft is in the eclipse portion of its trajectory, according to said position output signals and said velocity output signals so as to change the velocity of at least one of the spacecraft.

26. The method of claim 25 wherein the step of adjusting the ballistic coefficient further comprises changing the orientation of at least one solar panel on the spacecraft.

27. The method of claim 25 wherein the step of adjusting the ballistic coefficient further comprises changing the orientation of the spacecraft so as to alter the area of the spacecraft facing the direction of motion of the spacecraft.

28. The method of claim 25 further comprising the step of maintaining the spacecraft within a predetermined range of separation between them by controlling the velocity of each spacecraft with respect to one another.

29. A method for changing the planar separation between at least two groups of spacecraft orbiting a planetary body comprising the steps of:

adjusting the ballistic coefficient of each spacecraft in a first of the groups so as to increase the atmospheric drag on each spacecraft in the first group to thereby remove energy from the orbit of each spacecraft in the first group and cause the angular spacing between the first group and the at least one other group to change, wherein the angular spacing is changed without applying positive thrust to the spacecraft; and after the angular spacing between the first group the at least one other group has changed to a desired spacing, adjusting the ballistic coefficient of each spacecraft in the first group so as to decrease the atmospheric drag on each spacecraft in the first group to thereby maintain the angular spacing between the first group and the at least one other group.

30. A method for changing the angle of right ascension of a planar constellation of satellites orbiting a planetary body comprising:

adjusting the ballistic coefficient of spacecraft in the constellation so as to increase the atmospheric drag on spacecraft in the constellation, thereby removing energy from orbits of spacecraft in the constellation and causing the angle of right ascension of the constellation to change, wherein the angle of right ascension of the constellation is changed without applying positive thrust to the spacecraft; and adjusting the ballistic coefficient of spacecraft in the constellation so as to decrease the atmospheric drag on spacecraft in the constellation so as to maintain the angle of right ascension of the constellation.

31. A method of launching a spacecraft on a desired trajectory comprising:

launching the spacecraft on a launch vehicle;

separating the spacecraft from its launch vehicle;

applying positive thrust to achieve an initial separation rate, and reducing the separation rate by changing the ballistic coefficient of the spacecraft so as to achieve the desired trajectory, without applying positive thrust to the spacecraft.

* * * * *